Oct. 19, 1937.  A. O. FOX  2,096,356
POULTRY LAYING BATTERY
Filed May 14, 1936  7 Sheets-Sheet 2
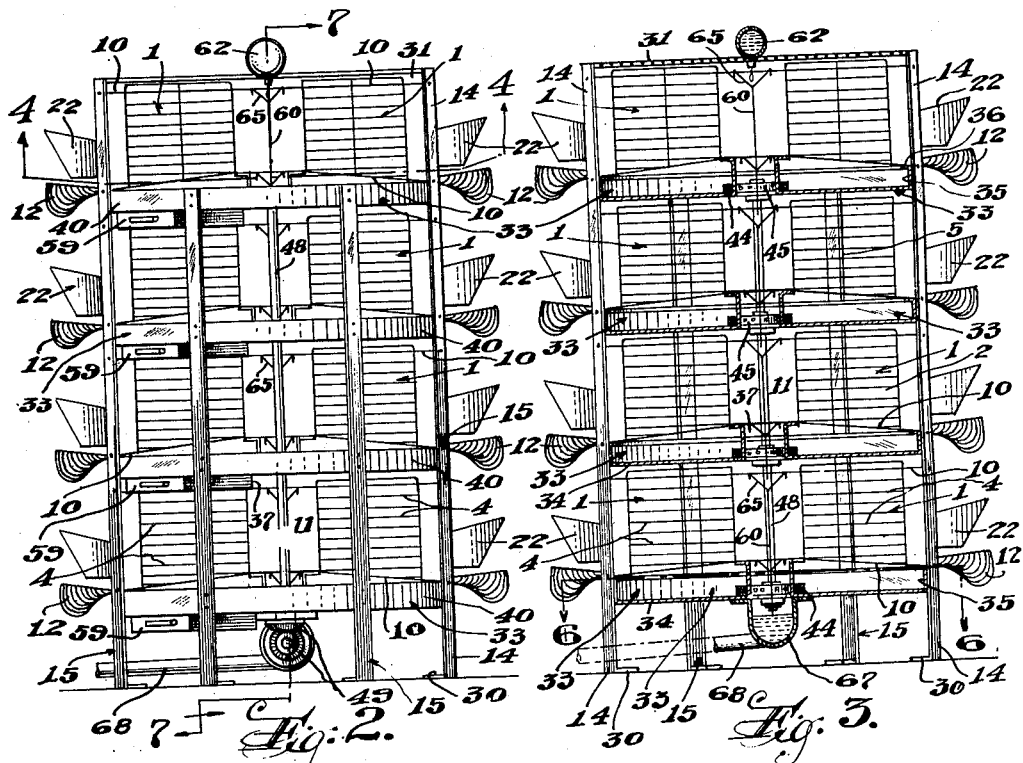
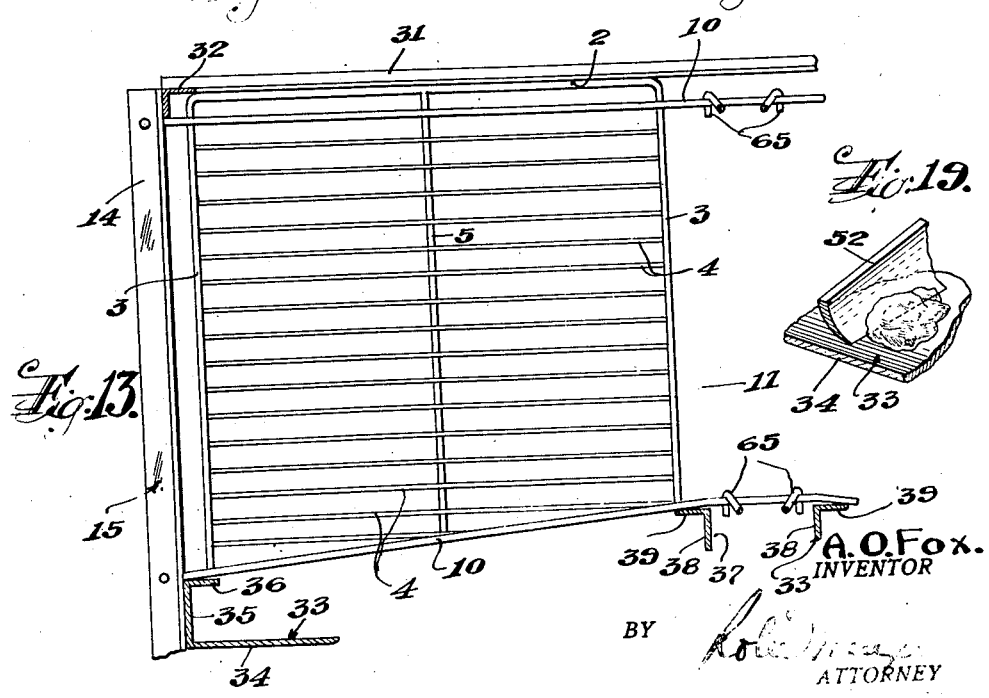

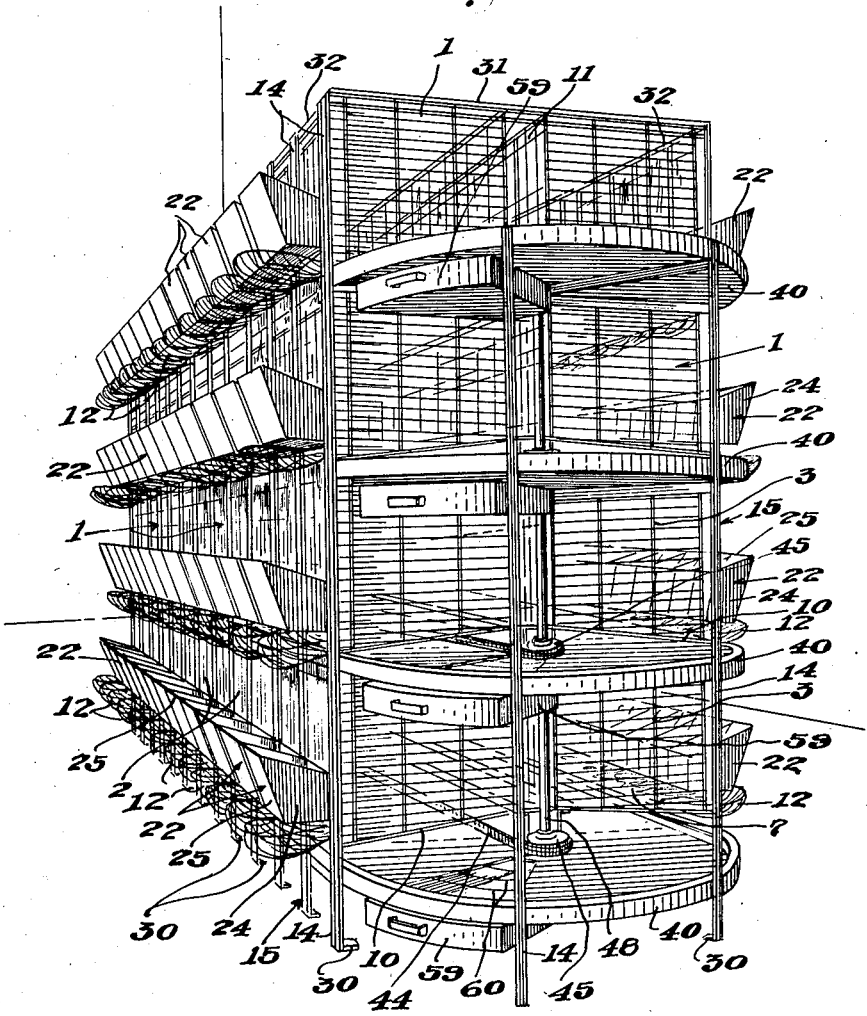

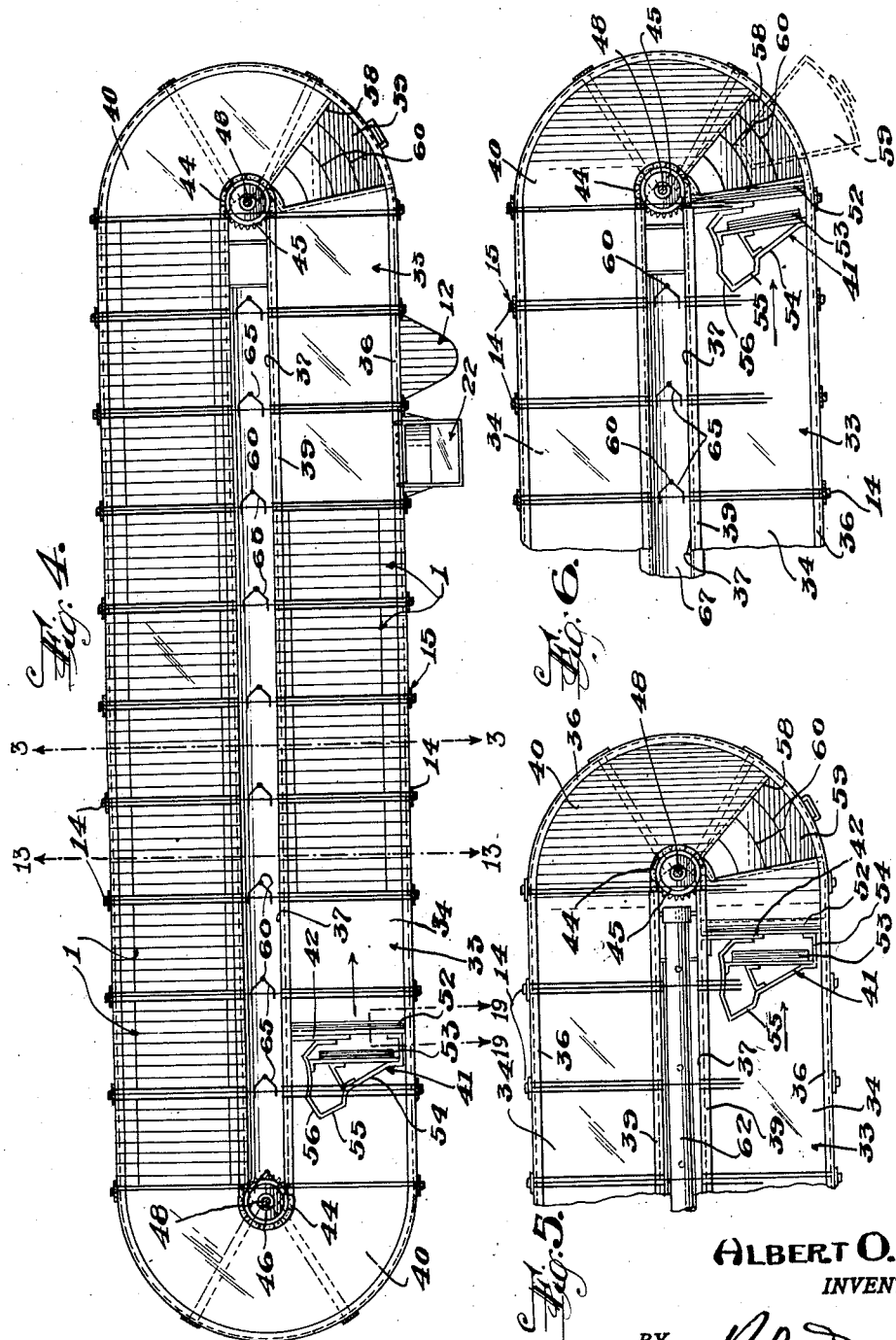

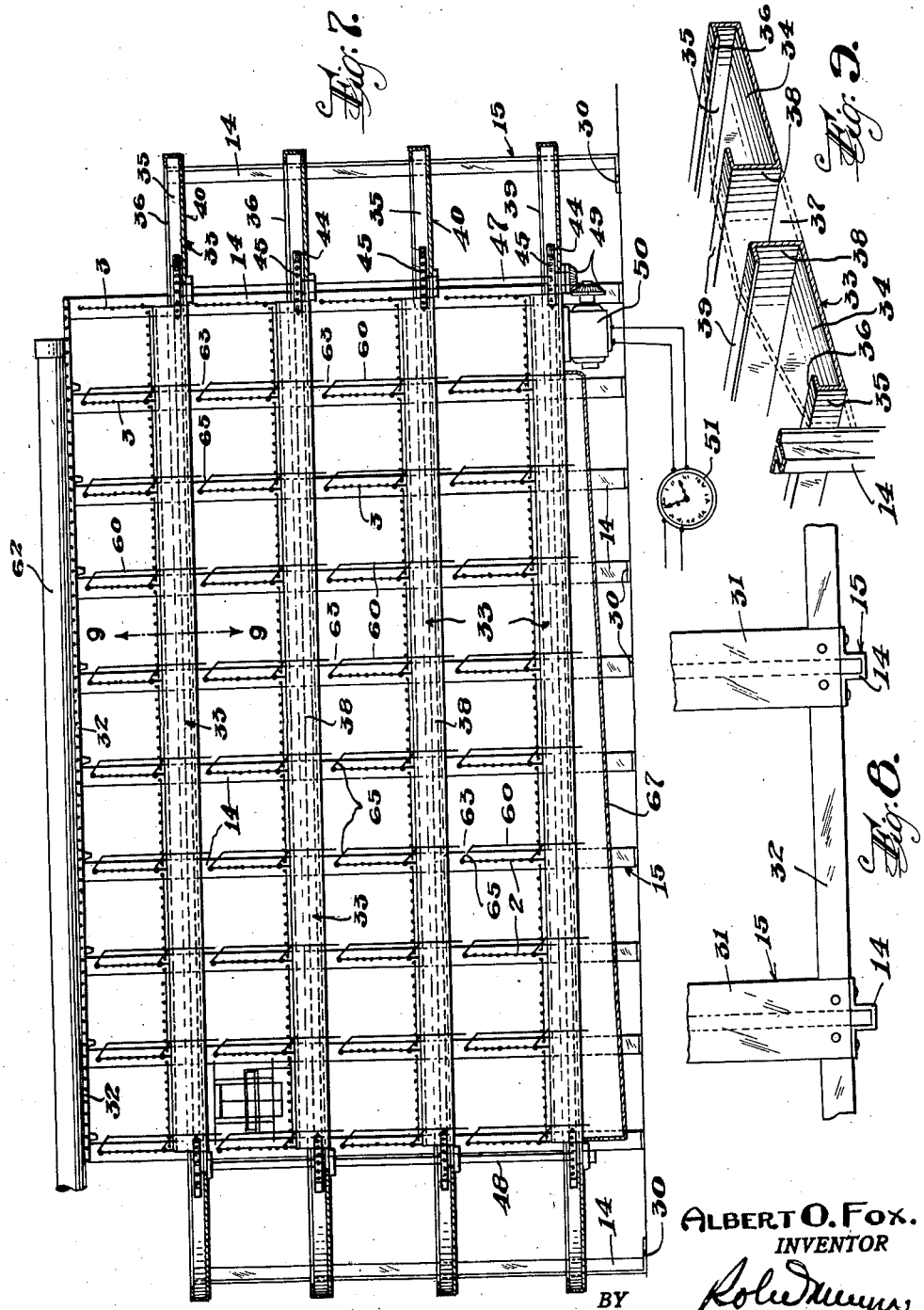

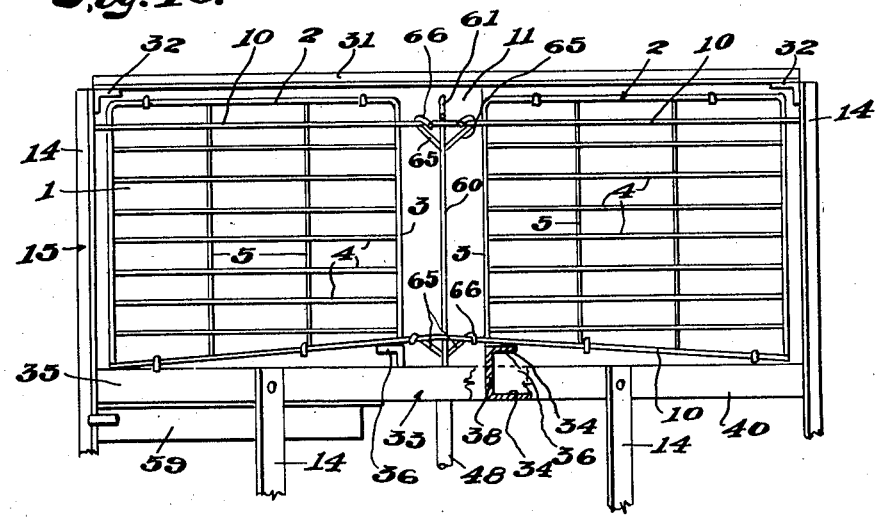
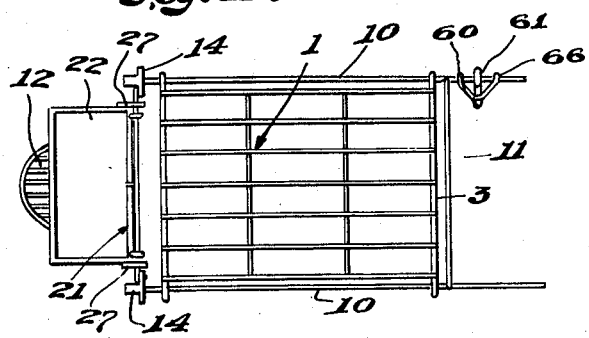
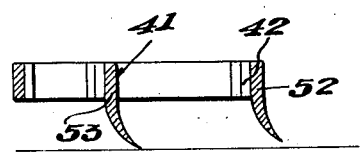
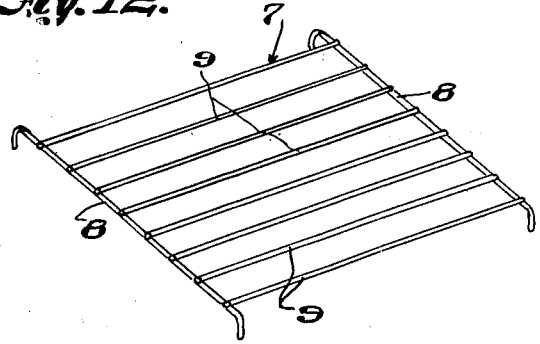

Oct. 19, 1937.　　　A. O. FOX　　　2,096,356
POULTRY LAYING BATTERY
Filed May 14, 1936　　　7 Sheets-Sheet 6
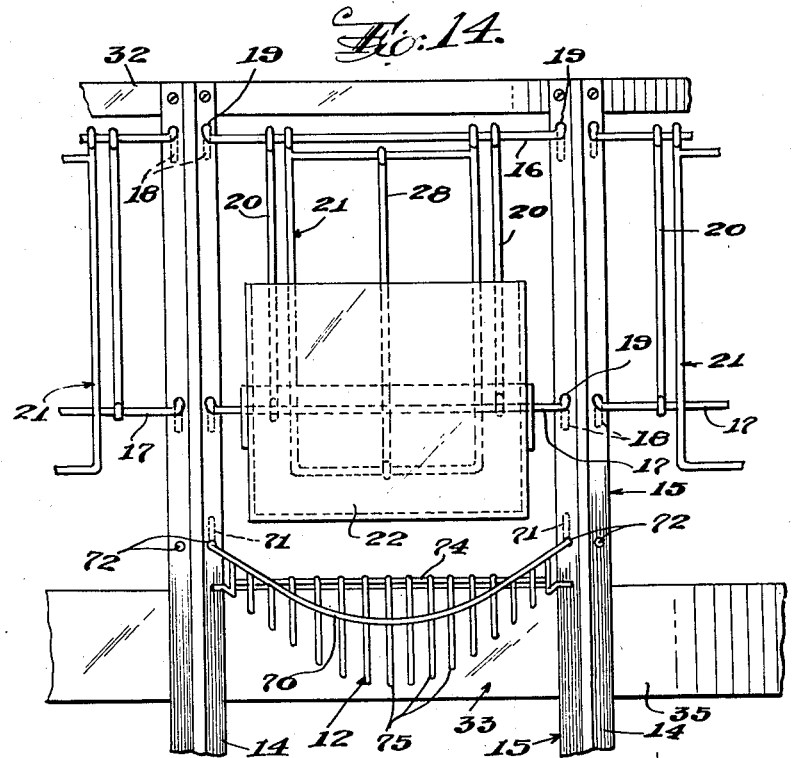
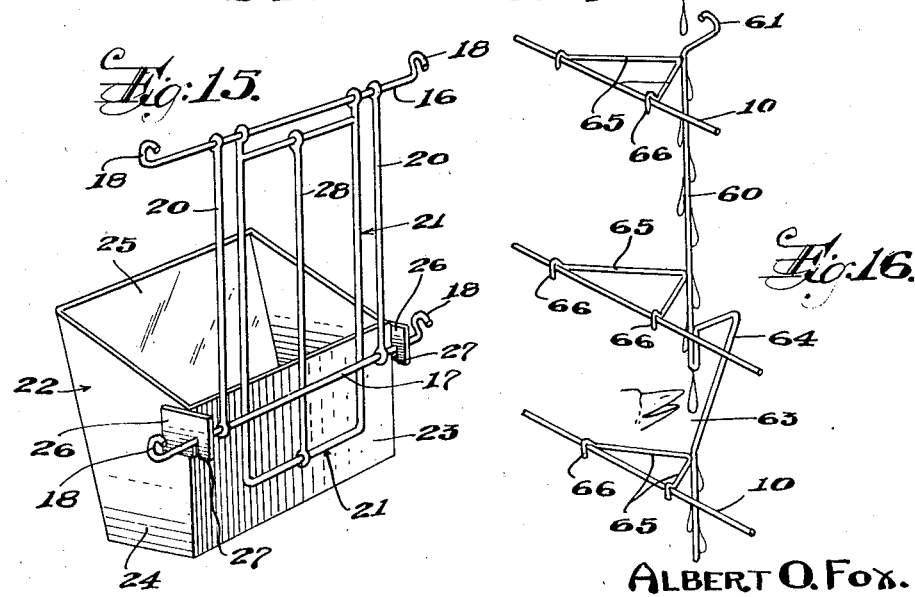
ALBERT O. FOX.
INVENTOR
BY
ATTORNEY

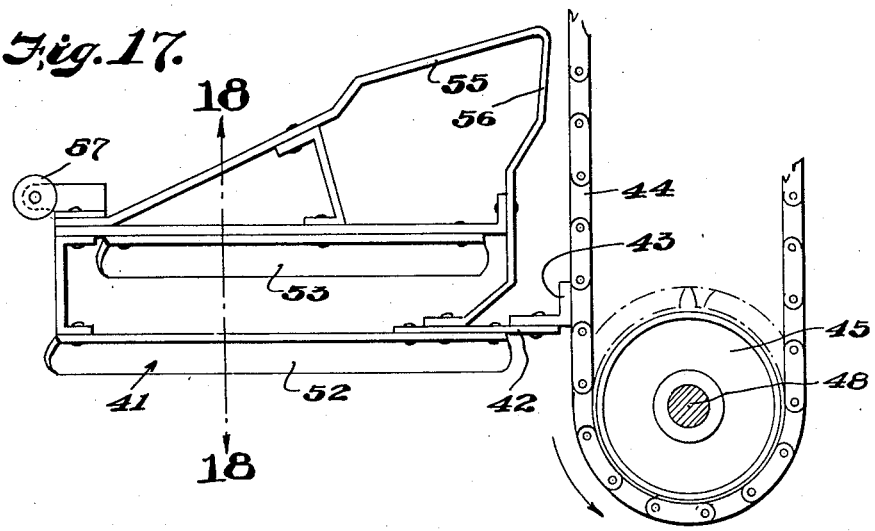
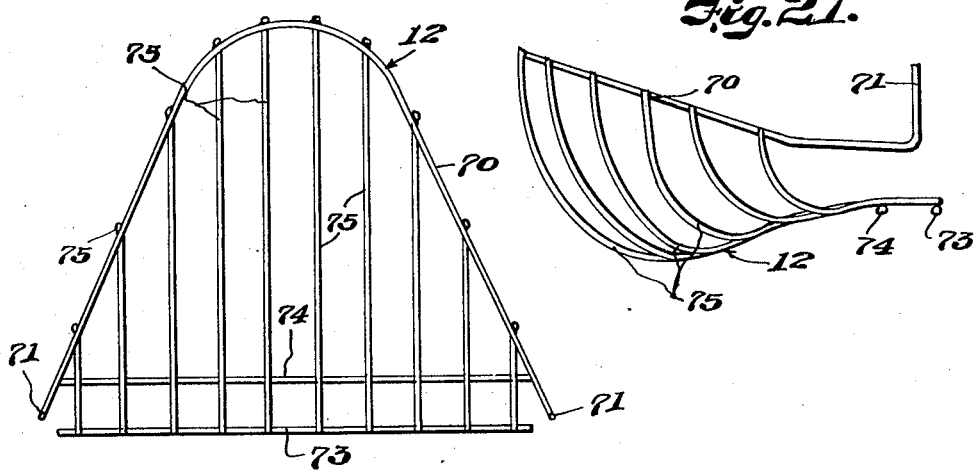

Patented Oct. 19, 1937

2,096,356

UNITED STATES PATENT OFFICE 2,096,356

POULTRY LAYING BATTERY

Albert O. Fox, Cranford, N. J., assignor to Fox Poultry and Equipment Company, Inc., Cranford, N. J., a corporation of New Jersey Application May 14, 1936, Serial No. 79,771

12 Claims. (Cl. 119—48)

This invention relates to laying cages for poultry and the primary object of the present invention is to provide a laying cage which will afford healthy sanitary houses for hens during their laying life and cages which will enable a single operator to take proper care of a much larger number of birds in a more practical economical and convenient way than would otherwise be possible.

Where the hens or birds are housed in floor flocks, that is, where a number of birds are housed in a group in a building or laying house, which has been the approved manner of keeping laying hens heretofore, the congested housing of such flocks has been found to bring about a breakdown of the stamina of the birds, and diseases are prevalent, with the result that the life of the birds is greatly shortened as well as their efficiency as layers. Also, research has developed the fact that where the birds or hens are allowed to range, that is, where they are allowed to run free outdoors over a range, their laying qualities are reduced and a hen on a range will not produce as many eggs over a given period of time as she will when kept in a sanitary, well-ventilated cage such as comprises the present invention. Birds or hens when allowed to range, require a much greater area of ground and considerably more work is involved in properly keeping them than is required with the use of improved laying cages of the present invention.

One of the primary objects of the present invention is to provide hen laying cages which will promote the health of the birds and their laying qualities, and in accomplishing this object, the present invention comprises a laying cage for an individual hen so designed that a number of the cages may be connected in a battery and still permit free air circulation about each individual hen, and provide an air shaft or passage which will carry off any foul air, and also to provide a novel easily operated, clean and sanitary means for removing the droppings from the cages as often as desired with a minimum amount of work by the person attending the flock, whereby the cages may be cleaned of droppings at least once or twice per day.

Another object of the present invention is to provide a novel, convenient structure for watering the birds, whereby there will always be available fresh clean running water for drinking purposes, and whereby the water will not become polluted or mingle with the feed and also to provide feed pans or troughs which are so arranged that the water can not get into them, and the food can not become polluted or fouled by the birds.

Other objects of the present invention are, to provide a novel type of egg basket, located outside of the individual cage, into which the egg rolls as soon as it is laid, which egg basket is shaped so that the egg is delivered into it without possibility of cracks or checks, one from which the egg may be easily removed and one in which the egg rests in such manner that it is impossible for the hen to reach it; to provide a novel arrangement of door by means of which the hen is put into the cage, which door is locked in closed position by the said pan or trough; to provide cages in which the floors are shaped and spaced to give a hen the best of footing and comfort, with sufficient spring to them to make them elastic under her weight, and so that they will not clog with feathers or droppings.

With these and other objects in view, as may appear from the accompanying specification, the invention consists of various features of construction and combination of parts, which will be first described in connection with the accompanying drawings, showing a battery of laying cages for poultry of the preferred form embodying the invention, and the features forming the invention will be specifically pointed out in the claims.

In the drawings:

Figure 1 is a perspective view of a battery of the improved cages.

Figure 2 is an end view of a battery of the cages.

Figure 3 is a vertical section through a battery of the cages and taken on the line 3—3 of Figure 4.

Figure 4 is a longitudinal horizontal section on the line 4—4 of Figure 2 through a battery of the cages.

Figure 5 is a fragmentary top plan of a part of a battery of cages having the cages removed and showing a part of one of the dropping receiving platforms.

Figure 6 is a horizontal section through a fragment of a battery of the cages and taken on the line 6—6 of Figure 3.

Figure 7 is a vertical section through a battery of the cages showing the supporting framework, platforms, etc., but having the cages themselves removed for purposes of clarity, and taken on the line 7—7 of Figure 2.

Figure 8 is a fragmentary detail in plan of a part of the assembly structure of the frame for carrying the plurality of cages.

Figure 9 is a fragmentary sectional view on the line 9—9 of Figure 7 through one of the dropping receiving platforms.

Figure 10 is an end view of a pair of the individual cages in position.

Figure 11 is a top plan of one of the cages.

Figure 12 is a detail plan of the bottom or floor of the cages.

Figure 13 is a fragmentary vertical section taken on the line 13—13 of Figure 4 of a part of the supporting frame and showing the manner of mounting the cages thereon.

Figure 14 is a fragmentary front elevation illustrating part of the supporting framework, the entrance door to an individual cage, the feed box and egg basket.

Figure 15 is a perspective view of the entrance door and feed box.

Figure 16 is a perspective view of the structure for watering the birds.

Figure 17 is a detail view of the scraper used in removing the droppings from the platforms.

Figure 18 is a detail section of the scraper taken on the line 18—18 of Figure 17.

Figure 19 is a fragmentary perspective view of a part of one of the blades of the scraper sectioned substantially on line 19—19 of Figure 4.

Figures 20 and 21 are detail views of the egg basket.

Referring more particularly to the drawings, the improved hen or poultry cages forming the present invention, while they are practically individual cages, each designed for containing one hen or bird, are particularly adapted to being arranged and connected in batteries such as is clearly shown in the drawings, and the present invention embraces not only the individual cage structure and its cooperating members, but embraces the assembly structure and carrying frame.

In the drawings, a battery of cages for retaining 96 birds is illustrated. However, it is to be understood that the cages may be arranged in any multiples of two, as desired, without departing from the spirit of the present invention.

The cages are arranged in vertical double tiers, each double tier comprising any suitable number of cages arranged in pairs in back to back relation as clearly shown in the drawings, and particularly as shown in Figure 10. The individual cages I comprise sides 2 formed of wire including a frame forming wire 3 which is of heavier gage than the spaced side forming wires 4. The side forming wires 4 are preferably welded to the frame forming wires 3 and to the bracing wire 5 although they may be attached thereto in any suitable manner without departing from the spirit of the present invention. The wires 4 are spaced apart sufficiently to permit free unimpeded circulation of air through the cages and yet sufficiently close to prevent the hens or birds from getting through them or becoming entangled between them. The rear walls or sides 6 of the individual cages are formed in the same manner as the sides 2 while the floors or bottoms 7 comprise end supporting wires or cross pieces 8 to which are welded or otherwise suitably attached a plurality of spaced wires 9 extending longitudinally of the floors. The spaced wires 9 are spaced apart sufficiently to permit droppings, feathers, and the like to fall therebetween, but close enough to provide proper footing for the birds. They also embody sufficient resiliency to provide a yieldable spring footing for the birds.

The sides of each opposed pair of cages are connected by supporting connecting rods or wires 10 which are welded or otherwise suitably attached to the sides of the cages of each opposed pair and extend across the space 11 between the rear ends of the cages. The end wires 8 of the floors 7 of the individual cages project beyond the outermost cross wires 9 and rest upon the lower connecting rods or wires 10 for supporting the floors. As clearly shown in Figures 10 and 13 of the drawings, the floors 7 incline downwardly from the inner or rear end of the cage to the forward or entrance end of the cage so that when the hen lays an egg on the floor it will gently roll down over the inclined floor and into the respective egg baskets 12.

The forward sides of the individual cages are separate units from the sides and back or rear wall of the cages and are detachably supported in place at the outer or forward ends of the cages through their connection with the uprights 14 of the supporting structure 15 which carries the battery of cages.

The front sides comprise upper and lower horizontal cross bars 16 and 17, the ends of which are shaped to form attaching hooks 18. The attaching hooks 18 engage through suitable openings 19 in the uprights 14. A pair of vertical wires or rods 20 are rigidly attached in spaced relation to the upper and lower cross bars 16 and 17 as clearly shown in Figures 14 and 15 of the drawings. The uprights 20 are spaced sufficiently to permit a hen to be passed beneath them into the cage and a door 21 is provided for closing the entrance opening between the uprights 20.

The door 21 is hingedly supported on the upper cross rod or wire 16 so that it may be opened outwardly and upwardly to permit a hen to be placed in the cage. The lower end of the door projects below the lower cross rod or wire 17 and engages against the outer side of this cross rod as clearly shown in Figure 15 of the drawings.

The door 20 is held locked in closed position by the feed box 22. The feed box 22 is constructed of sheet metal and has a straight rear side or back 23, a flat bottom, straight ends 24 and an outwardly and upwardly inclining front 25. The feed box increases in depth from its inner side 23 to its outer forward side 25 so as to provide a relatively high wall at the outer side of the feed box to prevent the birds from throwing the feed out of the box, thereby resulting not only in a conservation of the feed, but in preventing the soiling of the floor on which the batteries of cages are mounted by feed thrown out by the birds. The feed box is preferably extra large in comparison with its actual need thereby giving assurance of no waste and also providing ample space to carry food for three or four days, without wastage.

The feed box is supported in door locking position by attaching brackets 26 which are suitably attached to the ends of the feed box and are provided with notches 27 for engagement over the lower cross rod 19 and clamp the door 21 tightly against this cross rod so as to prevent the bird from opening the door. The door 21 is shown as provided with a centrally spaced upright 28 which is spaced relative to the side edges of the door to permit the bird to freely get her head through the door for access to the feed in the feed box.

The supporting frame 15 which supports the individual cages in battery formation comprises a plurality of uprights 14 which are made of channel metal to provide sufficient strength and stability and maintain light weight in the construction of the supporting frame. Their lower ends are preferably angled to provide feet as shown at 30 which rest upon the floor on which the battery of cages is supported. These uprights 14 are connected at their upper ends by cross bars 31 of similar construction and by longitudinally extending braces or bars 32 which may be flat strips of metal, so as to bind all of the uprights in a rigid construction, and they are connected at vertically spaced points intermediate their ends by the dropping receiving platforms 33. A dropping receiving platform 33 is placed beneath the floors of each horizontal double tier of cages and extends entirely throughout the length of the battery of cages, projecting beyond the ends of the endmost cages in the battery as clearly shown in Figures 4 to 7 inclusive of the drawings.

The dropping receiving platforms 33 comprise the flat base 34 on which the droppings, feathers, etc., fall, and they have their outer edges upturned as shown at 35 and turned inwardly as shown at 36 to provide sides for the platforms which will prevent droppings or other foreign material from falling off the edges of the platforms during the cleaning operation thereof. The portions of the platforms which extend beneath the cages of each battery are provided with longitudinally extending slots or open spaces 37 which register with the open spaces 11 formed between the inner or rear ends of the individual cages, thus providing an air shaft extending vertically throughout the entire length of the battery of cages so as to permit a draft of air upwardly therethrough for drawing any foul air out of the cages and maintaining a free circulation of air through the cages. The edges of the platforms 33 along the slots 37 are upturned as shown at 38 and turned inwardly as shown at 39 so as to provide side walls to prevent the droppings from falling off the inner edges of the platforms along the slots. The end portions 40 of the platforms 33 which project beyond the endmost cages in the battery are substantially semi-circular shaped in plan, as clearly shown in Figures 4 to 6 inclusive of the drawings, and they are so shaped to form arcuate guides for the scraper structures 41 which travel over the platforms 33 for cleaning them.

One scraper structure 41 is provided for each platform and it comprises a carrying bar 42 which is attached by means of a suitable attaching bracket 43 to a sprocket chain 44. The sprocket chain 44 travels about sprockets 45 and 46 which are mounted on vertical shafts 47 and 48 located one at each end of the battery of cages. The shaft 47 extends vertically through the platforms 33 at the ends of the slots 37 therein. The shaft 47 is connected by suitable gearing 49 to an electric motor or other suitable operating means 50 which will rotate the shaft 47 and consequently move the sprocket chains about over the platforms 33 at the edges of the slots 37 therein and thereby move the scraper structures 41 over the platforms for the purpose of cleaning them. The energizing of the motor 50 may be controlled in the usual manner by the usual type of push button (not shown) or if it is so desired it may be controlled by any approved type of the switch structure as indicated at 51 in Figure 7 of the drawings so that the energizing of the motor 50 and consequently the cleaning of the platforms 33 may be carried out at predetermined time intervals without requiring the attention of the operator or person taking care of the birds in the batteries.

The scraper structures 41 comprise roughing blades 52 which are attached to the attaching bar 42 and finishing scraper blades 53 which are supported rearwardly of the roughing blades 52. The blades 52 and 53 are connected by a suitable supporting frame structure 54 which clearly is shown in Figure 17 of the drawings. The supporting frame structure 54 has portions 55 and 56 of its inner end and rear side bent or spaced outwardly from the remaining portions of their respective parts of the frame and disposed at acute angles to each other to provide substantially a cam which will engage the sprocket chain as the scraper and chain move about the sprocket to give a cant or momentarily give an impetus to the movement of the scraper to cause it to properly travel about the path formed by the curved ends 40 of the platforms. If it is so desired rollers as indicated at 57 in Figure 17 of the drawings may be carried by the frame for engagement with the inner sides of the outer vertical sides 35 of the dropping receiving platforms or these rollers may be dispensed with as shown at Figures 4 to 6 of the drawings.

The blades 52 and 53 curve forwardly as clearly shown in Figure 19 so as to efficiently scrape the droppings from off the upper surfaces of the platforms.

The curved ends 40 of the platforms are provided with cut-out portions or openings 58 therein and dropping receiving drawers 59 are slidably carried by the platforms 33 beneath the openings 58 so that as the scrapers 41 move over the openings 58 the material scraped from the platforms 33 will be dropped into the drawers 59. The drawers may then be easily removed and taken to any suitable place for emptying. A plurality of wires 60 are welded or otherwise suitably attached to the platforms 33 and extend across the openings 58 serving to prevent sagging of the scrapers 41 as they are passing over the openings 58, and these wires are slightly resilient, so that they will permit a minimum vibration of the scrapers and facilitate the removal of the droppings or other foreign material from the blades.

The present poultry laying cage structure comprises novel means for supplying fresh clean water to the birds in the cages and this means includes a plurality of drip rods 60, a fragment of which is shown in perspective in Figure 16 of the drawings. The rods 60 are preferably formed of wire or other suitable material and they have their upper ends bent laterally and formed in a hook as shown at 61 for engagement with a suitable cross wire 10 of the topmost tier of cages. The drip rods 60 extend downwardly through the air shaft 11 and are positioned preferably near the inner corners of the individual cages so that one rod will supply drinking water to the birds in four cages of each horizontal tier or row of cages. The water drops upon the upper end of the drip rods from a suitable supply pipe 62 which may receive water from any suitable source such as from a city main. The drip rods are provided with interruptions as indicated at 63 in their vertical lengths and these interruptions may be formed by breaks in the rod or preferably by the bending laterally of portions of the rod as shown at 64 in Figure 16. The gaps 63 are located so that they can be conveniently reached by the birds in the cages. The water dropping upon the rods runs down the rods until it reaches one of the gaps or interruptions 63, where it then drops off the rod through the gap and again on the rod below the gap, providing open spaces through which the drops of water pass, so that the birds can easily and conveniently drink the water at these gaps or interruptions.

The drip rods 60 are removably supported in the shafts 11 by means of supporting braces 65 which are welded or otherwise suitably connected to the rods and have hooks 66 formed on their ends which engage over the cross rods 10. The water drips from the lower ends of the rods into a suitable carry off trough 67 from which it may be conducted by a suitable pipe 68 to any suitable outlet.

The constantly running water over the drip rod 60 provides fresh clean water for the birds at all times and eliminates any liability of disease of the birds through the drinking of polluted water. Also by placing the drip rods in the shaft 11 a long distance away from the feed troughs 22 any liability of wetting of the feed in the feed boxes is eliminated.

The feed boxes 22 and the lower ends of the doors 21 are spaced above the floors 7 of the cages sufficient distance to permit eggs which are laid on the floor by the hens to pass beneath the lower ends of the feed boxes and to roll into the egg baskets 12.

The egg baskets 12 are of a novel construction and are illustrated in detail in Figures 20 and 21 of the drawings.

The egg baskets 12 include the edge forming wires or rods 70, the ends 71 of which are angled for engagement through openings 72 in the uprights 14 for attaching the egg baskets to the supporting frame 15. The edge forming wires 70 incline inwardly from the inner receiving end of the basket and are curved to form a rounded outer end of the basket. A pair of cross braces 73 and 74 are provided at the inner receiving end of the basket and form the inner edge of the base of the basket which engages against the uprights 14 in close proximity to the floor 7 so that the eggs may roll in an uninterrupted travel to the baskets. A plurality of bottom and side forming wires 75 have their inner ends suitably attached to the cross rods or wires 73 and 74 and they extend outwardly and curve downwardly for the larger portion of their distance, then curve upwardly and have their outer ends attached to the edge-forming wire 70. This construction forms an open egg basket having a rounded bottom forming a concave portion into which the egg rolls, and as clearly shown in the drawings, the bottom curves upwardly from its lowermost portion rather abruptly, so as to provide a curved surface over which the egg will roll or rock in case the hen attempts to pick or break the egg. Also the egg receiving basket is of sufficient size and length that when the egg rolls into the lowermost portion, it will be spaced from the cage proper so far that it will be extremely difficult for the hen to reach it. The curved surfaces of the various wires forming the egg basket curve in a continuous smooth incline to the lowermost portion of the egg basket, which merges accurately with the inclined bottom 7 of the cage so that the egg after it is laid will roll over a smooth uninterrupted path into the lowermost portion of the basket from which it may be easily and conveniently removed.

It will be understood that the invention is not to be limited to the specific construction or arrangement of parts shown but that they may be widely modified within the invention defined by the claims.

What is claimed is:

1. In poultry cages, a supporting frame, a plurality of individual cages carried by said frame and arranged in vertical double tiers, each vertical double tier comprising a plurality of individual cages, the cages being arranged in superposed pairs of horizontal rows with the backs of the cages in one row of each pair being spaced from the backs of the cages in the other row of each pair to provide an air shaft between the cages, and watering drip rods extending downwardly in said shaft, said rods having interrupted portions therein to form water dripping spaces.

2. In poultry cages, a supporting frame, a plurality of individual cages carried by said frame and arranged in vertical double tiers, each vertical double tier comprising a plurality of individual cages, the cages being arranged in superposed pairs of horizontal rows with the backs of the cages in one row of each pair being spaced from the backs of the cages in the other row of each pair to provide an air shaft open at its top, bottom, and ends between the cages, dropping receiving platforms beneath said cages provided with openings registering with said air shaft, scrapers for cleansing said platforms, means for moving said scrapers over said platforms, drawers removably carried by said platforms for receiving the material scraped from the platforms, and watering drip rods extending downwardly in said shaft, said rods having interrupted portions therein to form water dropping spaces.

3. In poultry cages, a supporting frame, a plurality of individual cages carried by said frame and arranged in vertical double tiers, each vertical double tier comprising a plurality of individual cages, the cages being arranged in superposed pairs of horizontal rows with the backs of the cages in one row of each pair being spaced from the backs of the cages in the other row of each pair to provide an air shaft between the cages, a dropping receiving platform beneath each pair of rows of cages, a cleaning scraper for movement over each platform, and means for moving said scraper over the platform in a continuous path in one direction beneath one row of cages and in the opposite direction beneath the other row of cages in each pair of rows.

4. In poultry cages, a supporting frame, a plurality of individual cages carried by said frame and arranged in vertical double tiers, each vertical double tier comprising a plurality of individual cages, the cages being arranged in superposed pairs of horizontal rows with the backs of the cages in one row of each pair being spaced from the backs of the cages in the other row of each pair to provide an air shaft open at its top, bottom, and ends between the cages, a dropping receiving platform beneath each pair of rows of cages provided with an opening registering with said air shaft, a cleaning scraper for movement over each platform, means for moving said scraper over the platform in a continuous path in one direction beneath one row of cages and in the opposite direction beneath the other row of cages in each pair of rows, said cages having wire floors spaced about said platform and of sufficient resiliency to provide limited spring action under the weight of a hen.

5. In poultry cages, means for watering a bird in a cage comprising a drip rod onto one end of which water is delivered, said rod having a portion thereof bent to one side of the line of the rod to form a gap over which water falls.

6. In poultry cages, means for watering a bird in a cage comprising a drip rod onto one end of which water is delivered, said rod having a portion thereof bent to one side of the line of the rod to form a gap over which water falls, and supporting brackets on said rod.

7. In poultry cages, a supporting frame, a plurality of individual cages carried by said frame and arranged in vertical double tiers, each vertical double tier comprising a plurality of individual cages, the cages being arranged in superposed pairs of horizontal rows, with the backs of the cages in one row of each pair being spaced from the backs of the cages in the other row of each pair to provide an air shaft between the cages, and means for watering birds in said cages comprising vertical drip rods onto the upper ends of which water is delivered, said rods having interruptions therein at spaced intervals to form gaps over which the water falls.

8. In poultry cages, an individual cage formed of spaced wires and having an opening to permit entrance of a bird into the cage, a door for closing said opening, a cross rod carried by said cage and engaging said door to limit its inward movement, a feed box, and means on said feed box for engagement with said cross rod to support said feed box, said feed box engaging said door on the side of the door opposite to said cross rod to lock the door in closed position.

9. In poultry cages, a supporting frame comprising a plurality of uprights, cross bars connecting their upper ends and side bars connecting their upper ends, a plurality of dropping receiving platforms attached to said uprights in vertical spaced relation, opposed rows of foraminous individual cages between said platforms, scrapers for cleaning said platforms, means for moving said scrapers over said platforms, said cages being formed of wire and having their facing inner ends spaced to form an air shaft between the pairs of opposed rows of cages, said platforms being provided with longitudinally extending slots alining with said spaces, the outer front ends of said cages including hinged doors, cross-rods against which said doors engage, feed boxes, means on said feed boxes for attaching them to said cross rods to support the feed boxes, said feed boxes engaging said doors to lock the doors in closed positions, and removable egg baskets attached to said uprights beneath said feed boxes, the floors of said cages inclining downwardly towards said egg baskets whereby eggs will roll from the floor into the egg baskets.

10. In poultry cages, a supporting frame comprising a plurality of uprights, cross bars connecting their upper ends and side bars connecting their upper ends, a plurality of dropping receiving platforms attached to said uprights in vertical spaced relation, opposed rows of foraminous individual cages between said platforms, said cages being formed of wire and having their facing inner ends spaced to form an air shaft between the pairs of opposed rows of cages, said platforms being provided with longitudinally extending slots aligning with said spaces, the outer front ends of said cages including hinged doors, cross rods against which said doors engage, feed boxes, and means on said feed boxes for attaching them to said cross rods to support the feed boxes.

11. In poultry cages, a supporting frame comprising a plurality of uprights, cross bars connecting their upper ends and side bars connecting their upper ends, a plurality of dropping receiving platforms attached to said uprights in vertical spaced relation, opposed rows of foraminous individual cages between said platforms, said cages being formed of wire and having their facing inner ends spaced to form an air shaft between the pairs of opposed rows of cages, said platforms being provided with longitudinally extending slots aligning with said spaces, vertical shafts adjacent to the ends of said slots, chains movable by rotation of said shafts, and scrapers carried by said chains and movable over said platforms for cleaning them.

12. In poultry laying cages, a supporting frame comprising a plurality of uprights, cross bars connecting the upper ends of said uprights and side bars connecting the upper ends of the uprights, a plurality of dropping receiving platforms attached to said uprights in vertical spaced relation, opposed rows of foraminous individual cages between said platforms, vertical shafts adjacent to the ends of said frames, chains movable about said shafts, scrapers carried by said chains and riding over the platforms for cleaning said platforms, and means for driving said chains.

ALBERT O. FOX.